(12) United States Patent
Kim et al.

(10) Patent No.: US 12,358,322 B2
(45) Date of Patent: Jul. 15, 2025

(54) DEFORMABLE WHEEL AND ROBOT EQUIPPED WITH SAME

(71) Applicant: SEOUL NATIONAL UNIVERSITY R&DB FOUNDATION, Seoul (KR)

(72) Inventors: Jongwon Kim, Seongnam-si (KR); Youngsoo Kim, Seoul (KR); Kijung Kim, Seoul (KR); Hwa Soo Kim, Yongin-si (KR)

(73) Assignee: Seoul National University R&DB Foundation, Seoul (KR)

( * ) Notice: Subject to any disclaimer, the term of this patent is extended or adjusted under 35 U.S.C. 154(b) by 1070 days.

(21) Appl. No.: 17/312,767

(22) PCT Filed: Dec. 11, 2019

(86) PCT No.: PCT/KR2019/017466
§ 371 (c)(1),
(2) Date: Dec. 14, 2021

(87) PCT Pub. No.: WO2020/122587
PCT Pub. Date: Jun. 18, 2020

(65) Prior Publication Data
US 2022/0097450 A1 Mar. 31, 2022

(30) Foreign Application Priority Data
Dec. 11, 2018 (KR) .................. 10-2018-0159256

(51) Int. Cl.
*B60B 15/22* (2006.01)
*B60B 19/02* (2006.01)
*B60B 19/04* (2006.01)

(52) U.S. Cl.
CPC .............. *B60B 15/22* (2013.01); *B60B 19/02* (2013.01); *B60B 19/04* (2013.01); *B60B 2900/551* (2013.01)

(58) Field of Classification Search
CPC ......... B60B 15/22; B60B 19/04; B62D 57/02; B62D 57/022; B62D 57/024; B62D 55/075
See application file for complete search history.

(56) References Cited

U.S. PATENT DOCUMENTS 3,226,129 A * 12/1965 Mckinley ............... A61G 5/065
152/5
8,011,736 B2 * 9/2011 Tan ......................... B60B 25/02
301/5.1
(Continued)

FOREIGN PATENT DOCUMENTS

EP 0686513 A1 12/1995
FR 2909035 A1 5/2008
(Continued)

OTHER PUBLICATIONS

Shen, S-Y et al., "Design of a Leg-Wheel Hybrid Mobile Platform," The 2009 IEEE/RSJ International Conference on Intelligent Robots and Systems, Oct. 2009, pp. 4682-4687.

*Primary Examiner* — Jason R Bellinger
(74) *Attorney, Agent, or Firm* — Fenwick & West LLP

(57) ABSTRACT

A deformable wheel includes: a plurality of lobes; wheel spokes connected to the plurality of lobes, respectively; and hinges pivotably connecting the wheel spokes to the lobes, wherein the wheel spokes are capable of two degree-of-freedom motion, and the plurality of lobes either form a circular shape due to the two degree-of-freedom motion of the wheel spokes, or separate from each other to form a deformed shape.

10 Claims, 31 Drawing Sheets

(56) References Cited

U.S. PATENT DOCUMENTS

| | | |
|---|---|---|
| 9,073,587 B2 | 7/2015 | Kim et al. |
| 9,199,679 B2 * | 12/2015 | Lecompte ............ B62D 57/024 |
| 10,518,576 B1 * | 12/2019 | Ebrahimi Afrouzi ........................ B60B 19/003 |
| 2012/0319457 A1 | 12/2012 | Jo |
| 2014/0158439 A1 | 6/2014 | Kim et al. |
| 2018/0022148 A1 * | 1/2018 | Lin ......................... B60B 1/006 152/5 |
| 2018/0257429 A1 | 9/2018 | Fourdrinier |

FOREIGN PATENT DOCUMENTS

| | | |
|---|---|---|
| JP | 2012-085854 A | 5/2012 |
| KR | 10-2011-0117489 A | 10/2011 |
| KR | 10-2012-0053236 A | 5/2012 |
| KR | 10-2012-0071187 A | 7/2012 |
| KR | 10-1386011 B1 | 4/2014 |
| KR | 10-2016-0041117 A | 4/2016 |
| KR | 10-2016-0105212 A | 9/2016 |
| KR | 10-2017-0083854 A | 7/2017 |
| KR | 10-2017-0091942 A | 8/2017 |
| KR | 10-2018-0089938 A | 8/2018 |
| WO | WO 94/20313 A1 | 9/1994 |

* cited by examiner

DEFORMABLE WHEEL AND ROBOT EQUIPPED WITH SAME

TECHNICAL FIELD

This disclosure to a two degree-of-freedom deformable wheel, and more particularly, to a deformable wheel, which moves in the form of a circular wheel on a flat ground, and when encountering an obstacle, makes two degree-of-freedom deformation into an optimal shape to minimize shaking of a body against the obstacle so that the body may overcome the obstacle smoothly and stably.

BACKGROUND ART

Various units attached to a driving platform of a service robot are inevitably short in width and length in order to efficiently travel within the radius of human life and to effectively interact with humans. As a result, the center of gravity of the entire service robot is inevitably high, so the service robot is greatly affected by even a small shake, and the possibility of overturning is greatly increased in some cases. Therefore, it is essential for the driving platform of the service robot to have the ability of driving smoothly and stably while maintaining small shaking when overcoming obstacles.

Most driving platforms of service robots that are currently commercialized adopt a wheel driving manner, which is has not only difficult to overcome stairs but also is difficult to overcome even a small raised spot on the floor, so the service robots can only be used in a limited environment of flat ground. In order to overcome the limitation of the obstacle overcoming performance of such a wheel structure, a conventional technique of a deformable wheel for improving the obstacle overcoming ability by deforming a wheel is disclosed in Patent Literature 1 (Korean Unexamined Patent Application No. 10-2016-0105212).

However, the structure of the conventional technique simply aims to overcome a high obstacle, and there is a limitation in that a vertical surface must be present for the deformation and there is required a friction with the vertical surface. Also, there is a problem in that the inclination of the trajectory changes discontinuously when overcoming obstacles, so that the shaking of the body is large. That is, the conventional technique for overcoming stairs has so many problems to be applied to a driving platform of a service robot since it is difficult to overcome various obstacles including a vertical plane, or its center of gravity is seriously shaken, or the structure and control are complicated inefficiently even with small shaking, or noise and vibrations. Thus, the conventional technique is not suitable for driving in an indoor environment. Therefore, there is a need to design a wheel structure that overcomes the problems of the conventional technique.

DISCLOSURE

Technical Problem

This disclosure is designed to solve the above problems of the prior art, and the present disclosure is directed to providing a deformable wheel, which has a wheel shape for maintaining efficient and stable driving performance on a flat ground and gives a deformed shape when overcoming obstacles of various heights without a vertical surface.

Technical Solution

In order to accomplish the above object, a deformable wheel according to the present disclosure is characterized by comprising a plurality of lobes; wheel spokes connected to the plurality of lobes, respectively; and hinges configured to pivotally connecting the wheel spokes to the lobes, wherein the wheel spokes are configured to perform two degree-of-freedom motion, and wherein the plurality of lobes are configured to either form a circular shape or a deformed shape separated from each other due to the two degree-of-freedom motion of the wheel spokes.

Also, the deformable wheel according to the present disclosure is characterized in that a wheel radius (r) and a lobe angle (θ) of the wheel spoke may be respectively controlled by the two degree-of-freedom motion.

According to an embodiment of the deformable wheel according to the present disclosure, the wheel spoke may include a fixing member having a plurality of distal ends; front pulleys and rear pulleys respectively provided at a center and the distal ends of the fixing member; a rotation pulley disposed at each front pulley provided at the distal end; a hinge pulley linked with the rotation pulley by a rotation belt and fixedly connected to the lobe; and a pulley member having one end fixedly connected to the rear pulley provided at the distal end and the other end on which the hinge pulley is disposed, wherein the front pulleys may be linked with each other by a front belt and the rear pulleys may be linked with each other by a rear belt.

According to another embodiment of the deformable wheel according to the present disclosure, the wheel spoke may include a fixing member; a rotary member having a plurality of distal ends and configured to be rotatable with respect to a shaft of the deformable wheel; a link member having one end pivotally connected to the distal end of the rotary member and the other end connected to be pivotal at a first hinge of the lobe; pulleys respectively disposed at a center and the distal ends of the fixing member; and a pulley member having one end fixedly connected to the pulley provided at the distal end and the other end connected to be pivotal at a second hinge of the lobe, wherein the pulleys may be linked with each other by a belt.

According to still another embodiment of the deformable wheel according to the present disclosure, the wheel spoke may include a first rotary member and a second rotary member respectively having a plurality of distal ends and configured to be rotatable with respect to a shaft of the deformable wheel; a first link member having one end pivotally connected to the distal end of the first rotary member; a slide member to which the other end of the first link member is pivotally connected, the slide member being connected to be pivotal at a first hinge of the lobe; and a second link member having one end pivotally connected to the distal end of the second rotary member and the other end connected to be pivotal at a second hinge of the lobe.

According to still another embodiment of the deformable wheel according to the present disclosure, the wheel spoke may include a first pinion and a second pinion configured to be rotatable with respect to a shaft of the deformable wheel; a first rack engaged with the first pinion; a second rack engaged with the second pinion; and a hinge member having one end pivotally connected to the first rack and the other end connected to be pivotal at a first hinge of the lobe, wherein the second rack may be connected to be pivotal at a second hinge of the lobe.

According to still another embodiment of the deformable wheel according to the present disclosure, the wheel spoke may include a first rotary member and a second rotary member respectively having a plurality of distal ends and configured to be rotatable with respect to a shaft of the deformable wheel; a first link member having one end pivotally connected to the distal end of the first rotary member; a first slide member to which the other end of the first link member is pivotally connected; a second link member having one end pivotally connected to the distal end of the second rotary member; a second slide member to which the other end of the second link member is pivotally connected, the second slide member being connected to be pivotal at a second hinge of the lobe; and a hinge member having one end pivotally connected to the first slide member and the other end connected to be pivotal at a first hinge of the lobe.

According to still another embodiment of the deformable wheel according to the present disclosure, the wheel spoke may include a fixing disk; a link disk configured to be movable with respect to a shaft of the deformable wheel; a piston disposed on the fixing disk to reciprocate in a radial direction and pivotally connected to the lobe; and a pair of link members configured to form a four-bar link between the lobe and the link disk.

According to still another embodiment of the deformable wheel according to the present disclosure, the wheel spoke may include a first disk and a second disk configured to be movable with respect to a shaft of the deformable wheel; a first link member having one end pivotally connected to the first disk; a first slide member to which the other end of the first link member is pivotally connected; a second link member having one end pivotally connected to the second disk; a second slide member to which the other end of the second link member is pivotally connected, the second slide member being connected to be pivotal at a second hinge of the lobe; and a hinge member having one end pivotally connected to the first slide member and the other end connected to be pivotal at a first hinge of the lobe.

In addition, a mobile robot according to the present disclosure is characterized by comprising the deformable wheel of the present disclosure; and a driving unit configured to drive the deformable wheel.

Advantageous Effects

The present disclosure is to overcome the limitations of the prior art, and since the deformable wheel has a wheel shape for maintaining efficient and stable driving performance on a flat ground and also may overcome obstacles while maintaining only contact with the ground by deforming the wheel shape, it is possible to smoothly and stably overcome obstacles of various heights without a vertical surface through a relatively small friction force.

In addition, by deforming into an optimal shape for obstacles of various sizes, it is possible to overcome obstacles stably and smoothly.

BEST MODE

Figure 1:
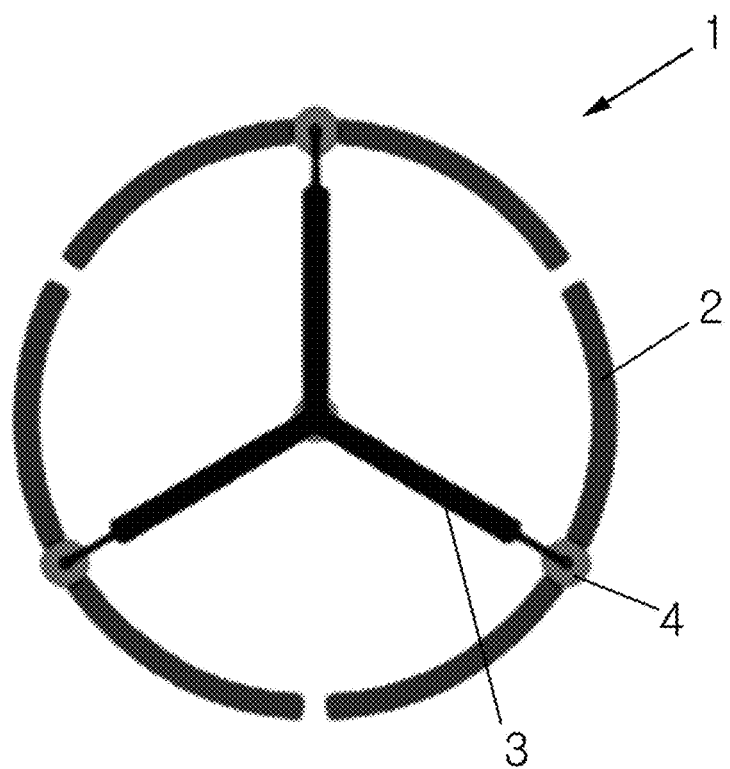
FIG. 1 is a schematic view showing a circular shape of a deformable wheel according to the present disclosure.

The present disclosure is designed with the support of the National Research Foundation of Korea, affiliated to the Ministry of Education of the Republic of Korea, under the supervision of the Industrial-Academic Cooperation Foundation of Kyonggi University, and the research project is titled "Development of a new-concept driving platform based on adaptive wheel (task unique number: 1345270163)", with the study period of Nov. 1, 2017 to Aug. 31, 2018.

Hereinafter, embodiments of a deformable wheel according to the present disclosure will be described with reference to the drawings. Although the present disclosure is described with reference to the embodiments shown in the drawings, this is to be described just as an embodiment, and the technical idea of the present disclosure and its core configuration and operation are not limited thereto.

Referring to FIG. 1, a schematic diagram of a deformable wheel 1 according to the present disclosure is shown. The deformable wheel 1 includes a plurality of lobes 2, wheel spokes 3 connected to the plurality of lobes 2, respectively, and hinges 4 configured to pivotally connect the wheel spokes 3 to the lobes 2. In the embodiment shown in the drawing of the present disclosure, the plurality of lobes 2 include three lobes 2, but the number of lobes 2 is not limited thereto. However, hereinafter, for convenience of explanation, it will be described that three lobes 2 are provided.

Figure 2:
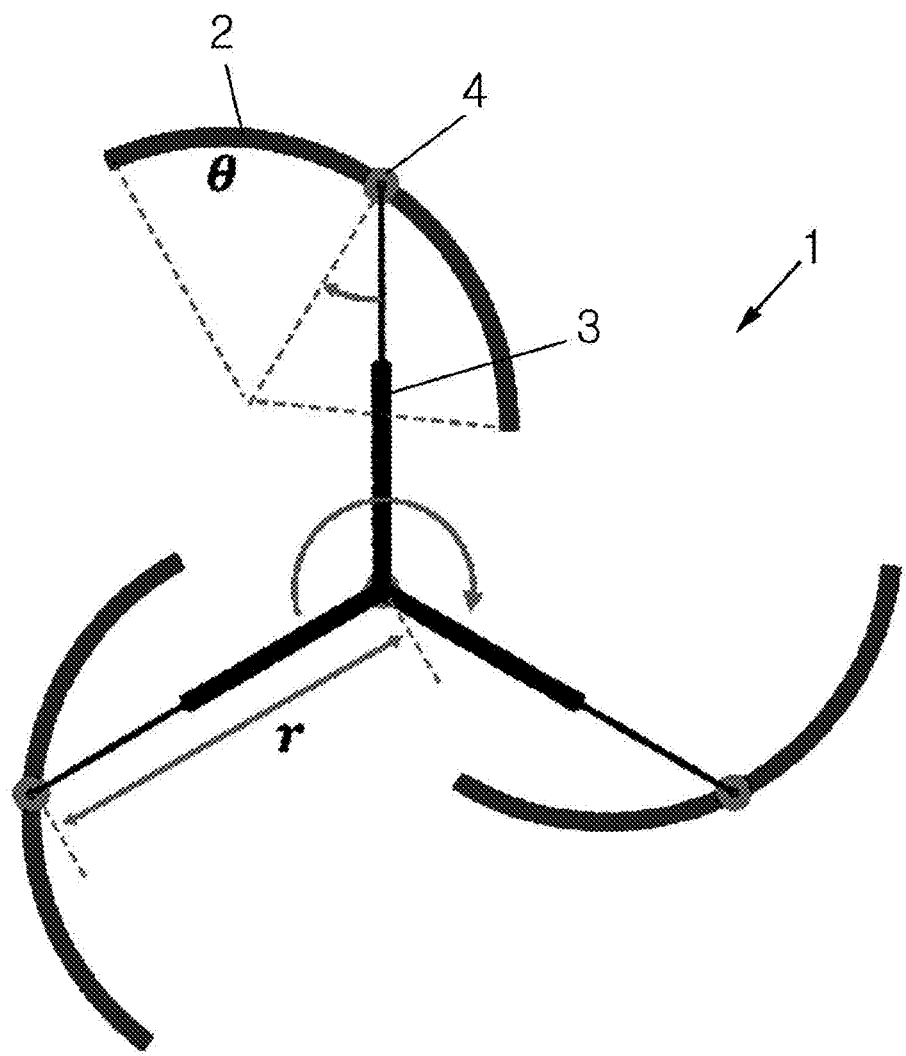
FIG. 2 is a schematic view showing a deformed shape of the deformable wheel depicted in FIG. 1.

FIG. 2 is a schematic view showing a deformed shape of the deformable wheel 1 depicted in FIG. 1. In the deformable wheel 1, the length from a center of the wheel to a point where the wheel spoke 3 and the lobe 2 are connected is defined as a wheel radius (r), and the angle formed by an imaginary line extending from a point where the wheel spoke 3 is connected to the center of curvature of the lobe 2 and the wheel spoke 3 is defined as a lobe angle (θ). The wheel spoke 3 of the deformable wheel 1 according to the present disclosure may perform two degree-of-freedom motion. By the two degree-of-freedom motion, the wheel radius (r) and the lobe angle (θ) are controlled, respectively, so that the deformable wheel 1 forms a circular shape as shown in FIG. 1 or a deformed shape which the lobes 2 are separated from each other as shown in FIG. 2.

FIGS. 3 to 14 show various embodiments of the wheel spoke 3 of the deformable wheel 1 according to the present disclosure. The embodiments show structures capable of performing two degree-of-freedom motion, but the present disclosure is not limited by the embodiments.

Figure 3:
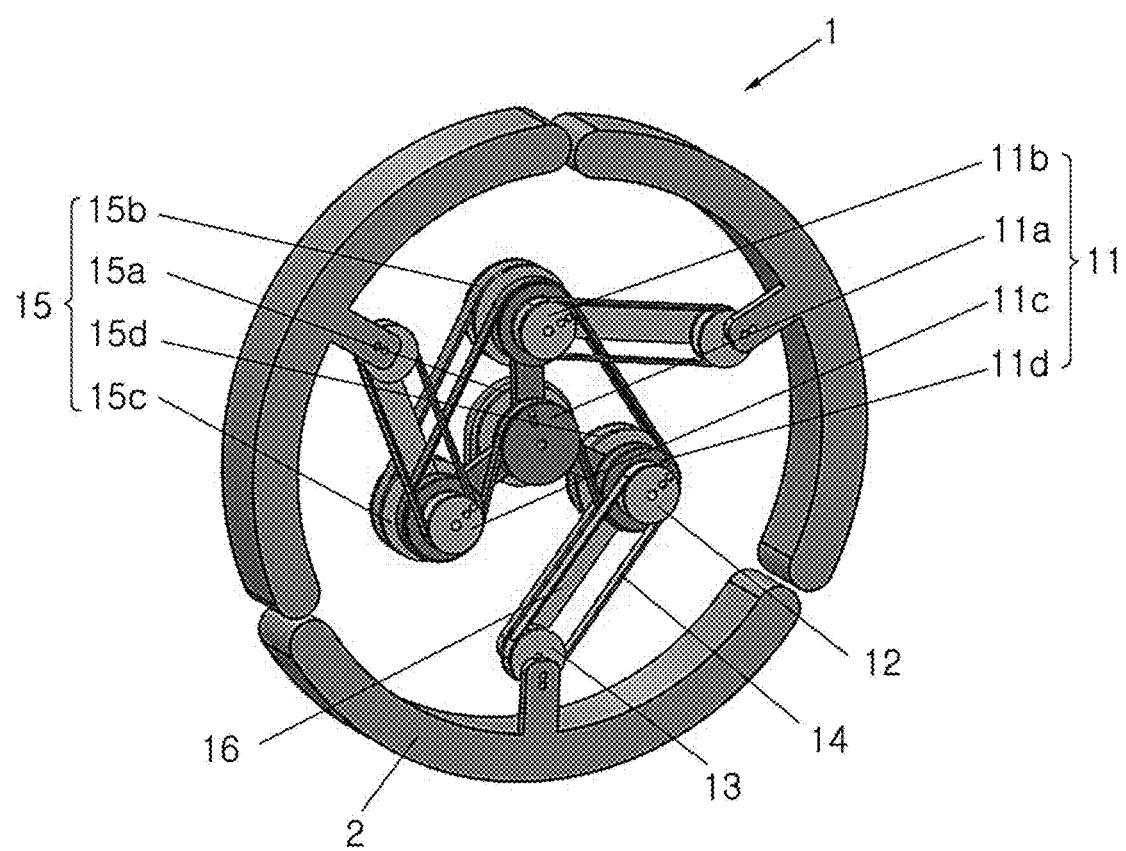
FIG. 3 is a schematic view showing a circular shape of a deformable wheel according to an embodiment of the present disclosure.

FIGS. 3 and 4 show an embodiment of the deformable wheel 1 having a pair of belt-pulley structures.

Referring to FIG. 3, in a fixing member having three distal ends, a front pulley 11 and a rear pulley 15 are respectively installed at a center and the three distal ends of the fixing member. A rotation pulley 12 is installed on the front pulleys 11b, 11c, 11d installed at the distal ends of the fixing member, and a hinge pulley 13 is fixedly installed to the lobe 2. The rotation pulley 12 is linked with the hinge pulley 13 by a rotation belt 14. One end of the pulley member 16 is fixedly connected to the rear pulleys 15b, 15c, 15d installed at the distal ends of the fixing member, and the hinge pulley 13 is installed at the other end of the pulley member 16. Also, the front pulley 11a and the rear pulley 15a are installed at the center of the fixing member, the four front pulleys 11a, 11b, 11c, 11d are linked with each other by one front belt 17, and the four rear pulleys 15a, 15b, 15c, 15d are linked with each other by one rear belt 18. Thus, all of the front pulleys 11b, 11c, 11d and the rear pulleys 15b, 15c, 15d installed at the distal ends are driven by the front pulley 11a and the rear pulley 15a installed at the center. In the drawings, three rotation pulleys 12 driven by the front pulley 11 and three pulley members 16 driven by the hinge pulley 13 and the rear pulley 15 are connected on three lobes 2, but reference numerals are indicated only for the structure connected to one lobe 2, and all lobes 2 and belt-pulley structures have the same configuration.

Figure 4A:
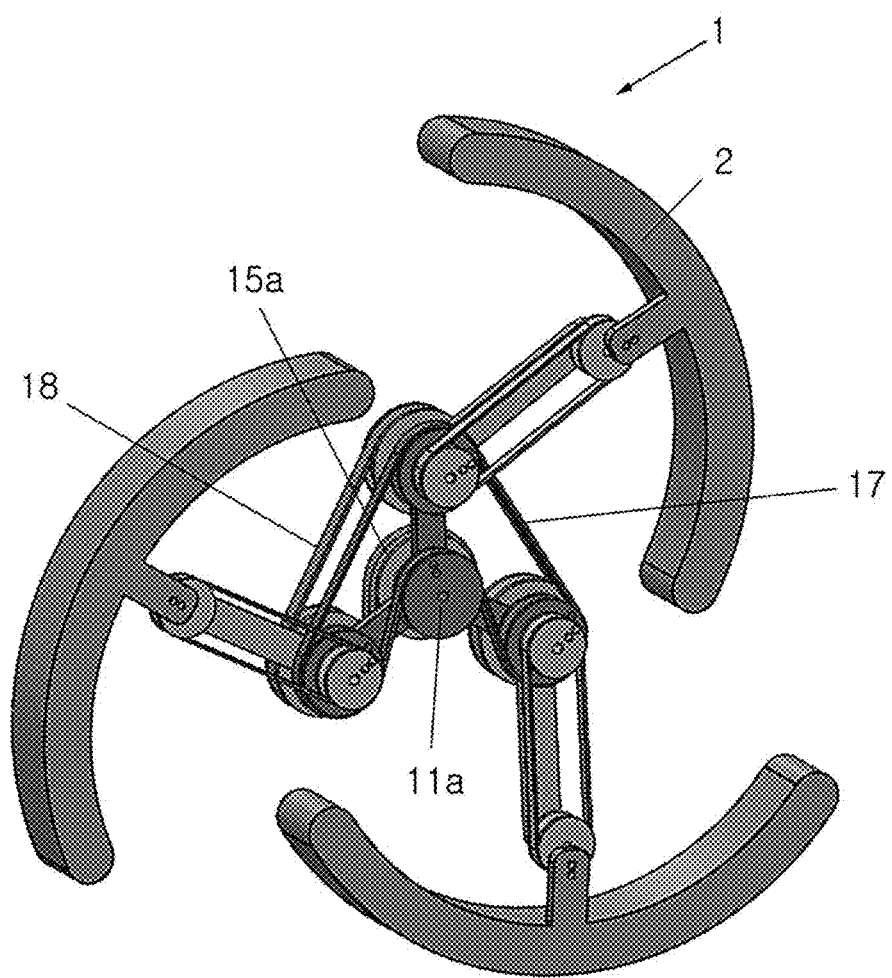
FIGS. 4A and 4B are schematic views showing examples of the deformed shape of the deformable wheel depicted in FIG. 3.
Figure 4B:
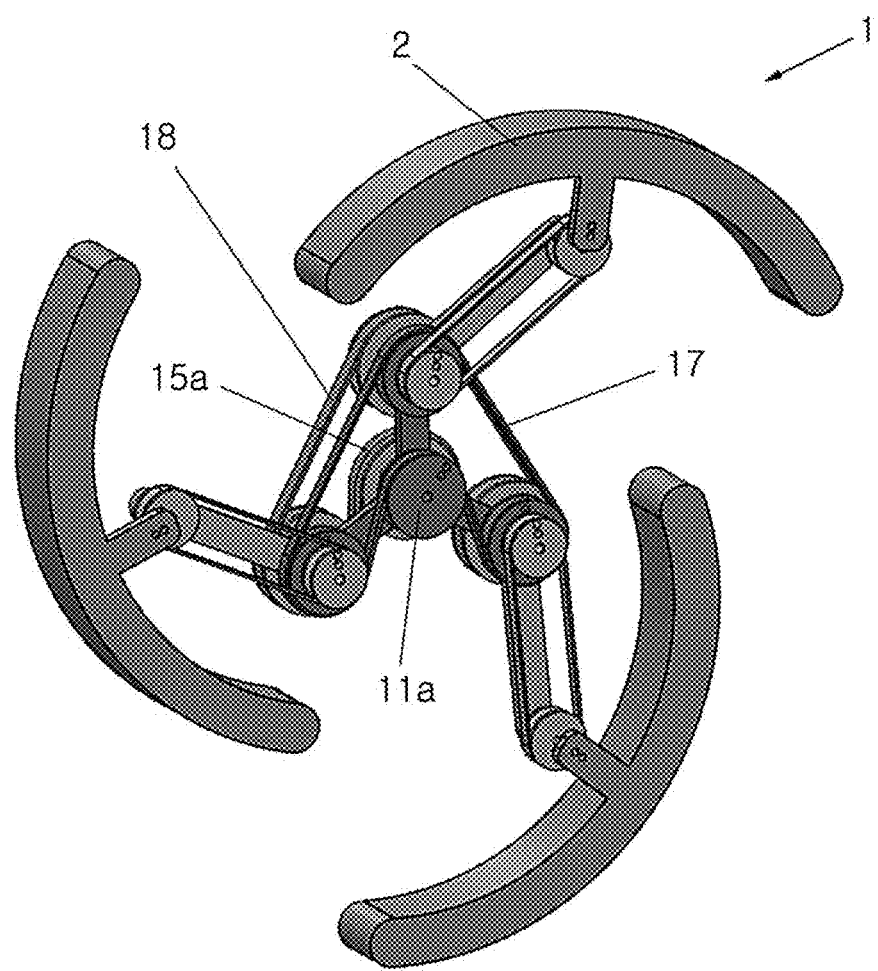

Referring to FIGS. 4A-B, an exemplary shape of the deformed shape of the deformable wheel 1 is shown. FIG. 4A shows a case in which the rear pulley 15 is driven, and the pulley member 16 pivots around the distal end of the fixing member by the driving of the rear pulley 15. That is, the pivoting motion of the pulley member 16 mainly controls the wheel radius (r), and the lobe angle (θ) is also changed because the pulley member 16 does not pivot at the center of the wheel. FIG. 4B shows a case in which the front pulley 11 is driven in FIG. 4A, and the rotation pulley 12 is driven together by the driving of the front pulley 11. That is, since the rotation pulley 12 is linked with the hinge pulley 13 by the rotation belt 14, the hinge pulley 13 is driven to adjust the lobe angle (θ). Therefore, the wheel radius (r) and the lobe angle (θ) may be controlled by driving each of the front pulley 11 and the rear pulley 15, respectively.

Figure 5:
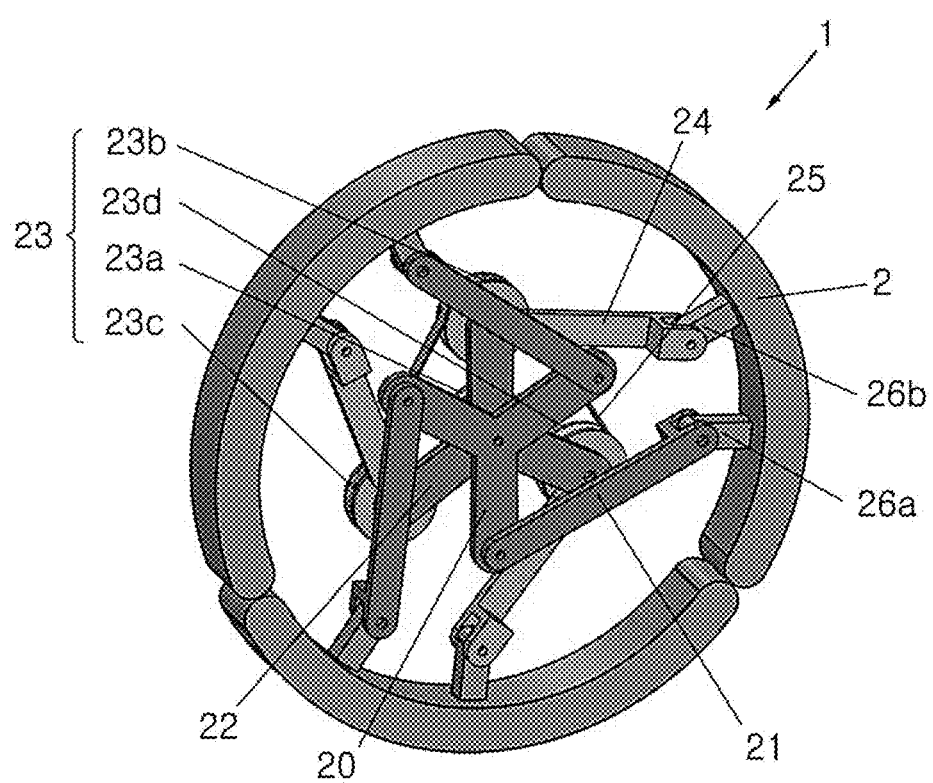
FIG. 5 is a schematic view showing a circular shape of a deformable wheel according to another embodiment of the present disclosure.

FIGS. 5 and 6 show another embodiment of the deformable wheel 1 having a pulley-link structure.

Referring to FIG. 5, a rotary member 20 and a fixing member 22 having a ternary link shape are installed at the center of the wheel 1, respectively. A link member 21 is pivotally connected to the rotary member 20, and the link member 21 is connected to be pivotal at a first hinge 26a of the lobe 2. A pulley 23 is installed at the center and three distal ends of the fixing member 22, respectively. A pulley member 24 is fixedly connected to the pulleys 23b, 23c, 23d installed at the distal ends, and the pulley member 24 is connected to be pivotal at a second hinge 26b of the lobe 2. Since the four pulleys 23 are configured to be linked with each other by one belt 25, all of the pulleys 23b, 23c, 23d at the distal ends are driven by driving of the pulley 23a installed at the center. In the drawing, three link members 21 driven by the rotary member 20 and three pulley members 24 driven by the pulley 23 are connected on three lobes 2, but reference numerals are indicated only for the structure connected to one lobe 2, and all lobes 2 and pulley-link structures have the same configuration.

Figure 6A:
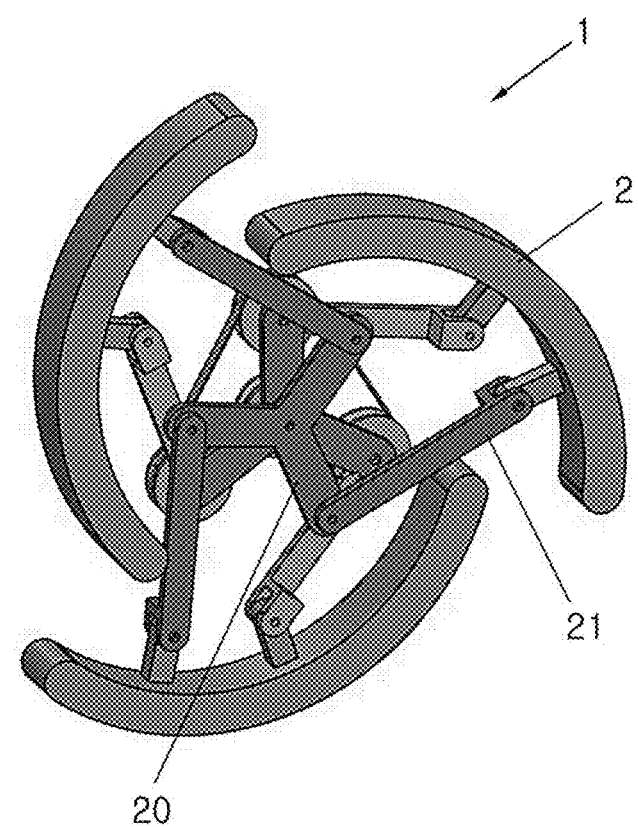
FIGS. 6A to 6C are schematic views showing examples of the deformed shape of the deformable wheel depicted in FIG. 5.
Figure 6B:
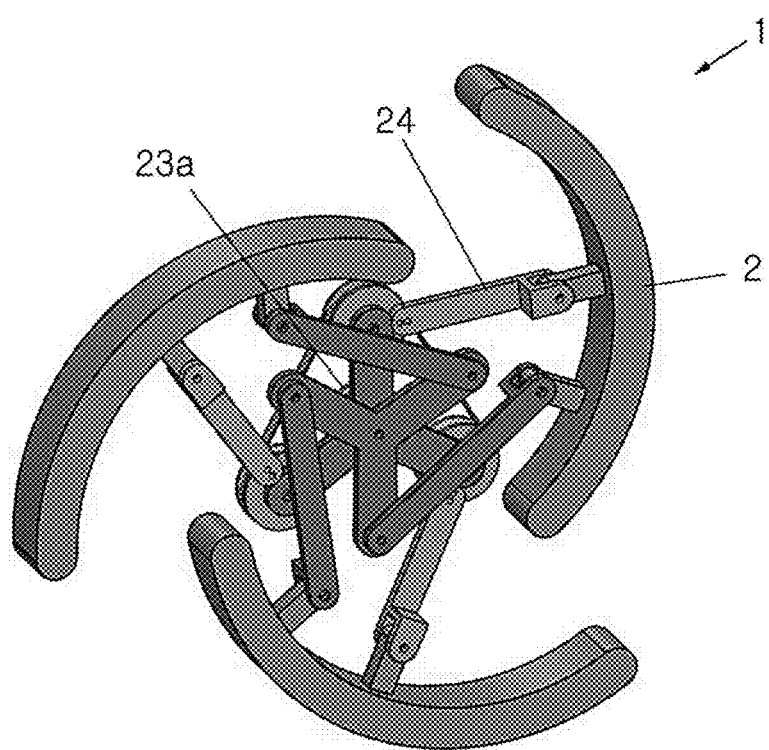
Figure 6C:
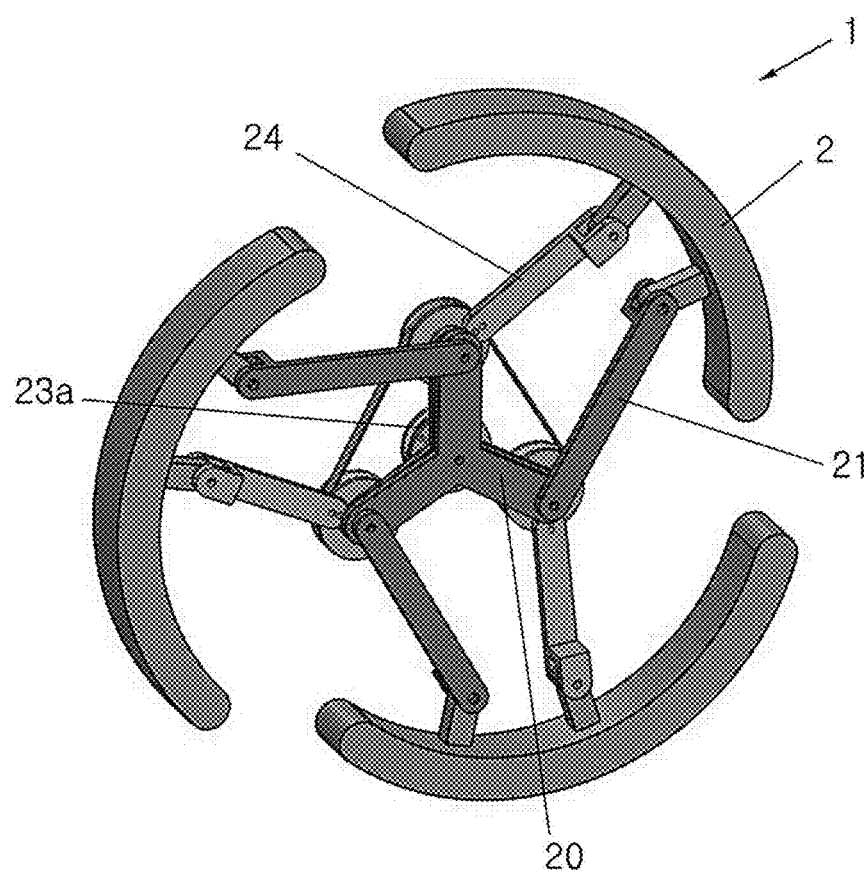

Referring to FIGS. 6A-C, an exemplary shape of the deformed shape of the deformable wheel 1 is shown. FIG. 6A shows a case in which the rotary member 20 and the link member 21 are driven, and the movement of the link member 21 by the driving of the rotary member 20 mainly controls the lobe angle (θ). FIG. 6B shows a case in which the pulley 23 and the pulley member 24 are driven, and the movement of the pulley member 24 by the driving of the pulley 23 mainly controls the lobe angle (θ) opposite to the case shown in FIG. 6A. FIG. 6C shows a case in which all of the rotary member 20, the link member 21, the pulley 23 and the pulley member 24 are driven, and the wheel radius (r) is mainly adjusted. Therefore, the wheel radius (r) and the lobe angle (θ) may be controlled by the driving of each of the rotary member 20 and the pulley 23, respectively.

FIGS. 7 and 8A-C show another embodiment of the deformable wheel 1 having a slide-link structure.

Figure 7:
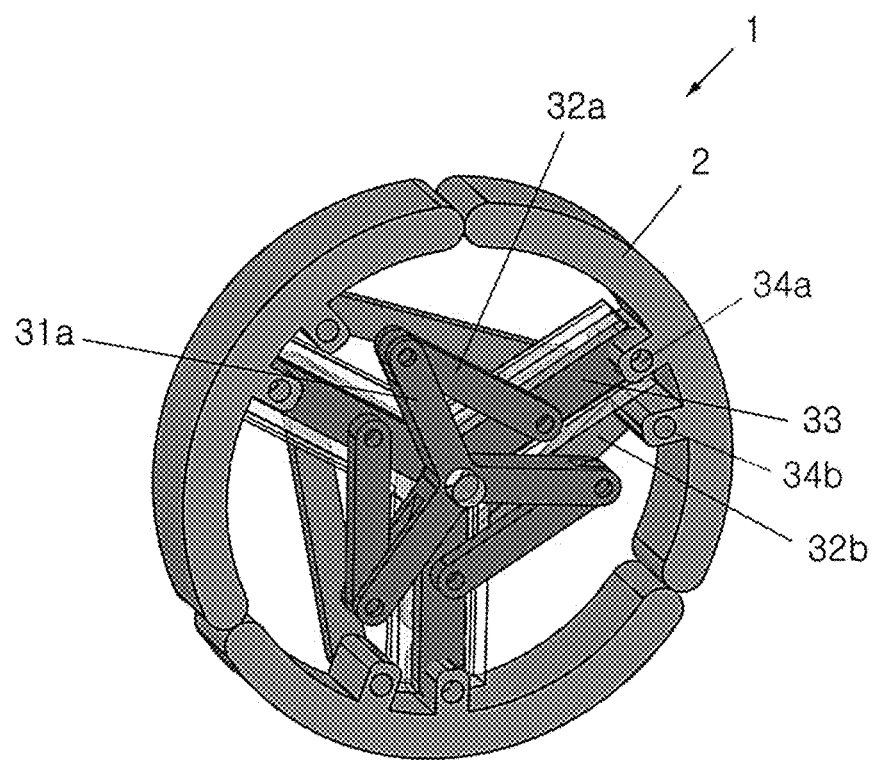
FIG. 7 is a schematic view showing a circular shape of a deformable wheel according to still another embodiment of the present disclosure.

Referring to FIG. 7, a pair of rotary members 31a, 31b having a ternary link shape are installed at the center of the wheel 1, and link members 32a, 32b are connected to the rotary members 31a, 31b, respectively. The first link member 32a is connected to the slide member 33, and the slide member 33 and the second link member 32b are connected to be pivotal at a first hinge 34a and a second hinge 34b of the lobe 2, respectively. In the drawing, three slide members 33 driven by the first rotary member 31a and three second link members 32b driven by the second rotary member 31b are connected on three lobes 2, but reference numerals are indicated only for the structure connected to one lobe 2, and all lobes 2 and slide-link structures have the same configuration.

Figure 8A:
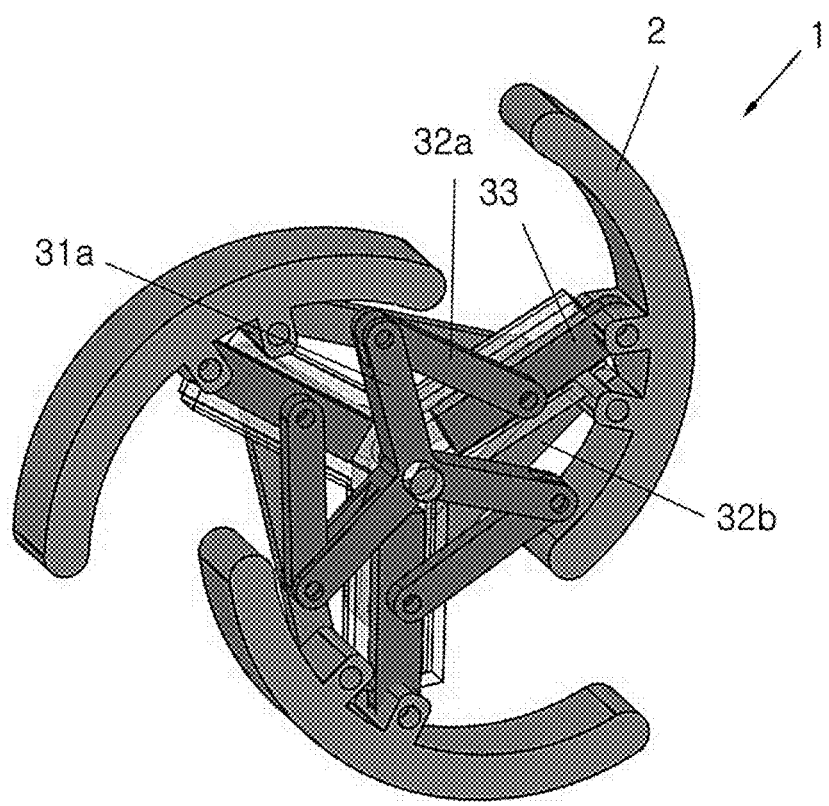
FIGS. 8A to 8C are schematic views showing examples of the deformed shape of the deformable wheel depicted in FIG. 7.
Figure 8B:
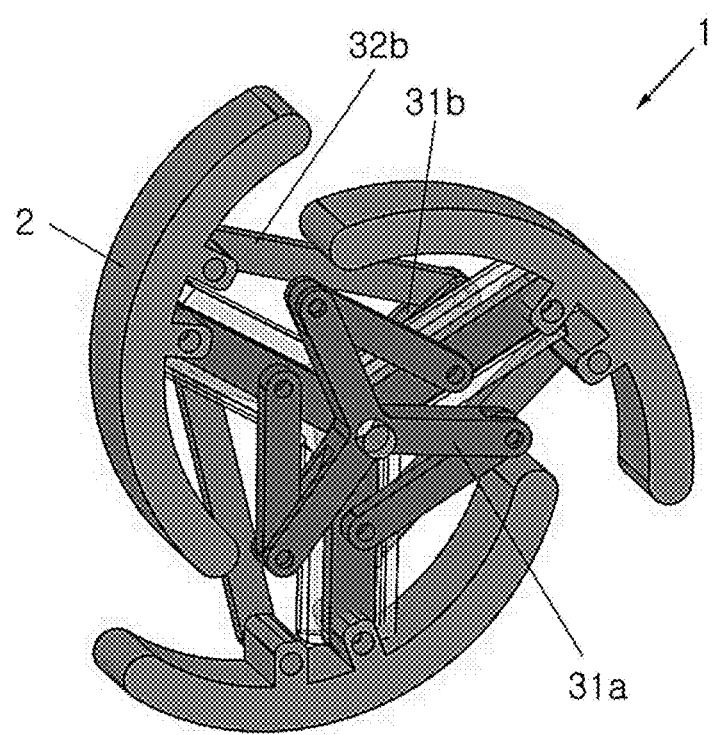
Figure 8C:
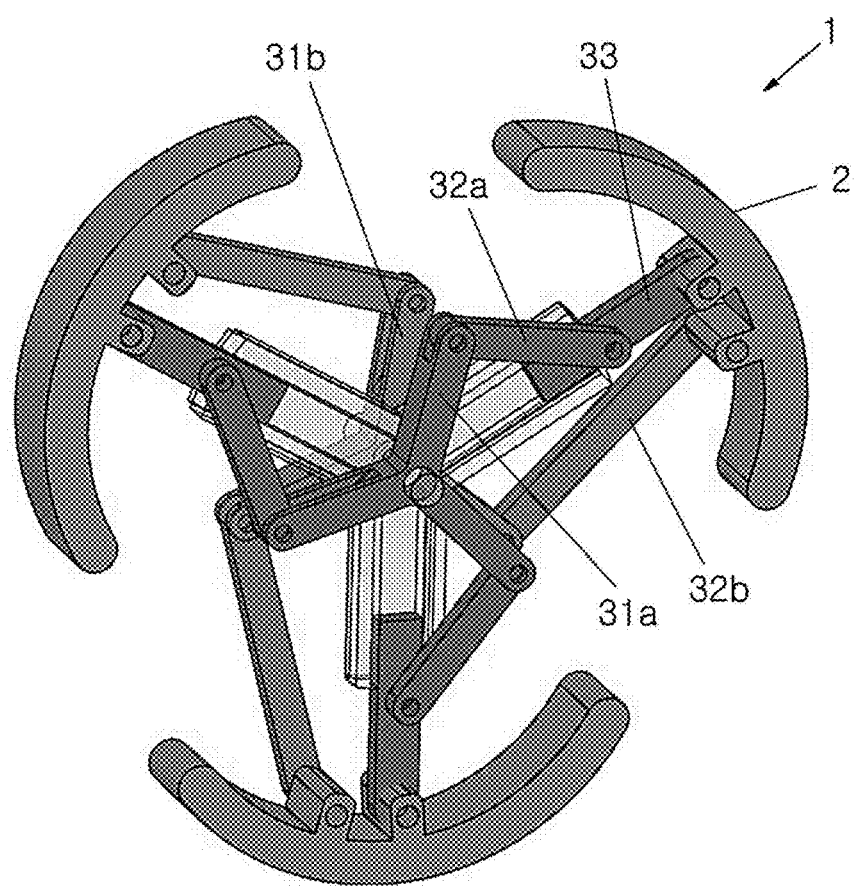

Referring to FIGS. 8A-C, an exemplary shape of the deformed shape of the deformable wheel 1 is shown. FIG. 8A shows a case in which the first rotary member 31a and the slide member 33 are mainly driven, and the movement of the slide member 33 by the driving of the first rotary member 31a mainly controls the lobe angle (θ). FIG. 8B shows a case in which the second rotary member 31b and the second link member 32b are driven, and the movement of the second link member 32b by the driving of the second rotary member 31b mainly adjusts the lobe angle (θ) opposite to the case shown in FIG. 8A. FIG. 8C shows a case in which all of the first rotary member 31a, the slide member 33, the second rotary member 31b and the second link member 32b are driven, and the wheel radius (r) is mainly adjusted. Accordingly, the wheel radius (r) and the lobe angle (θ) may be controlled by driving of each of the first rotary member 31a and the second rotary member 31b, respectively.

Figure 9:
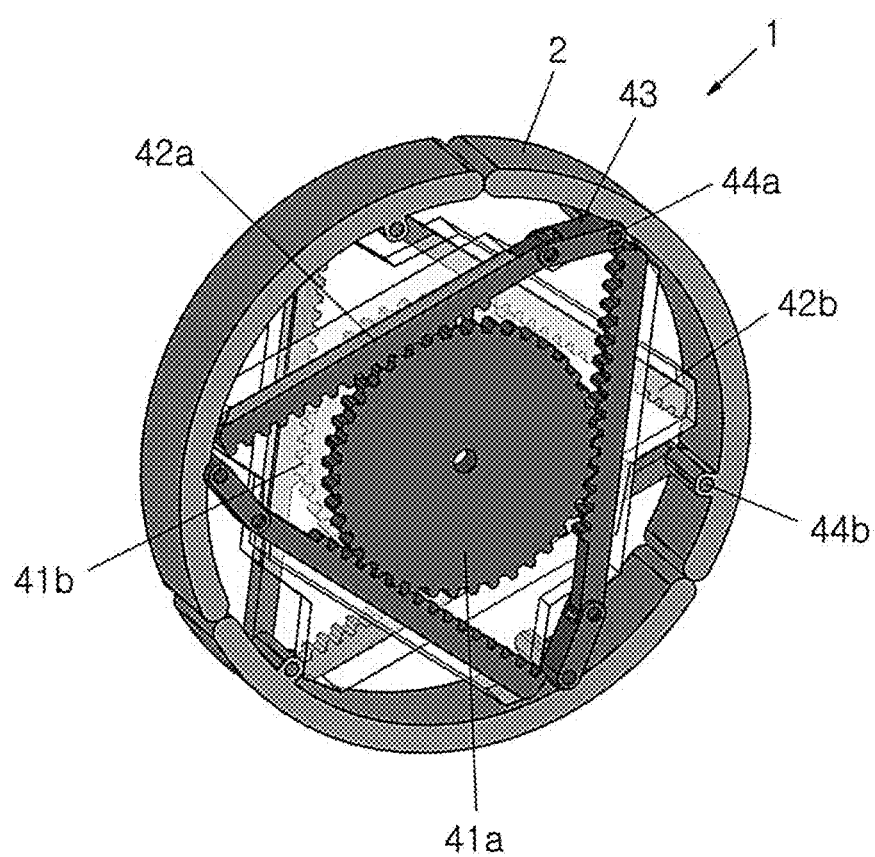
FIG. 9 is a schematic view showing a circular shape of a deformable wheel according to still another embodiment of the present disclosure.

FIGS. 9 and 10 show another embodiment of the deformable wheel 1 having a pair of rack-pinion configurations.

Referring to FIG. 9, a pair of pinions 41a, 41b are installed at the center of the wheel 1, and racks 42a, 42b respectively connected to the lobes 2 are engaged with the pinions 41a, 41b, respectively. In the drawing, three first racks 42a engaged with the first pinion 41a and three second racks 42b engaged with the second pinion 41b are connected on three lobes 2, but reference numerals are indicated only for the structure connected to one lobe 2, and all lobes 2 and rack-pinion structures have the same configuration.

In addition, two hinges 44a, 44b are formed on one lobe 2, so that the first hinge 44a is connected to the first rack 42a and the second hinge 44b is connected to the second rack 42b. At this time, the first hinge 44a and the first rack 42a are connected through a hinge member 43, and the hinge member 43 is connected to be pivotal at portions connected to the first hinge 44a and the first rack 42a, respectively. The second hinge 44b and second rack 42b are pivotally connected.

Figure 10A:
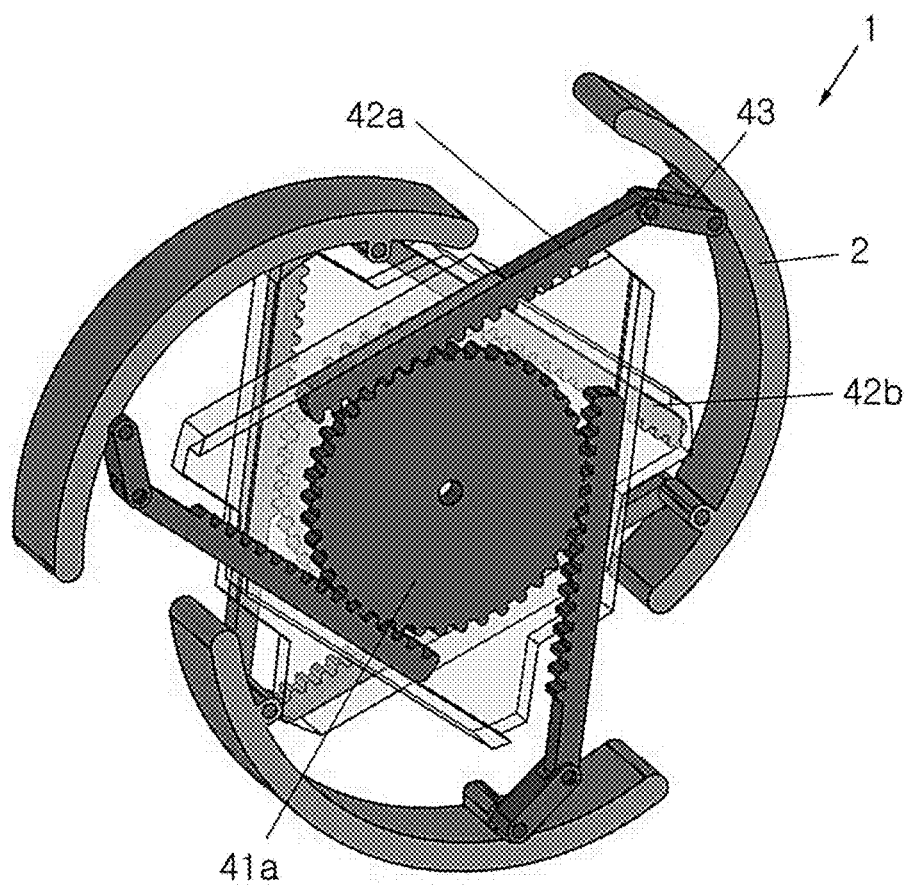
FIGS. 10A to 10C are schematic views showing examples of the deformed shape of the deformable wheel depicted in FIG. 9.
Figure 10B:
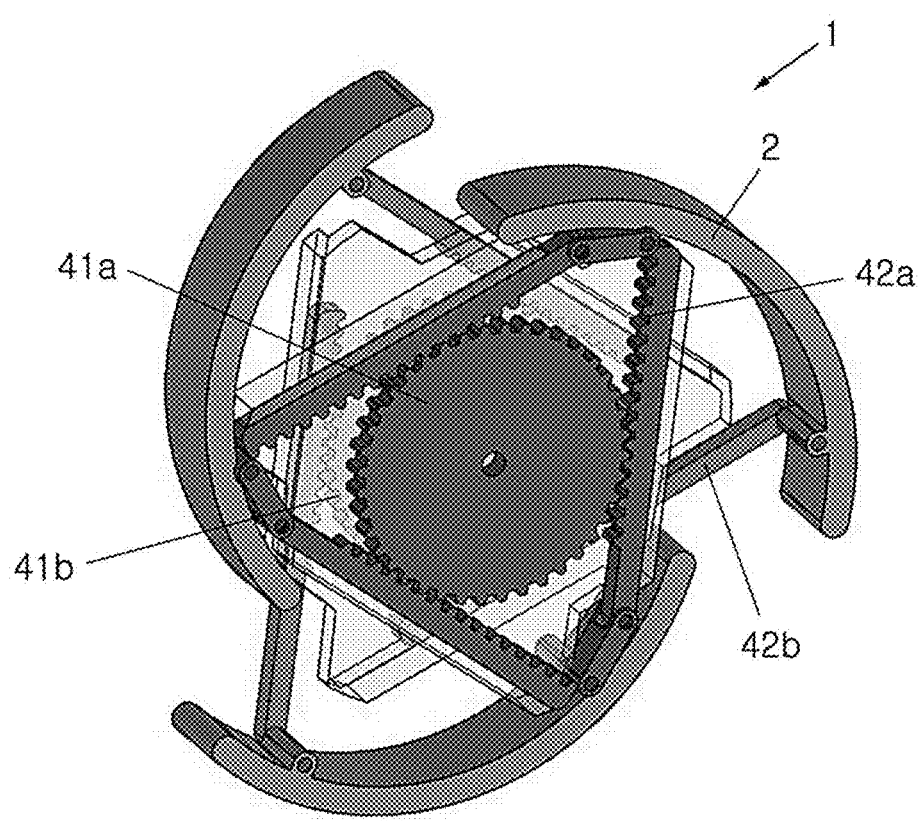
Figure 10C:
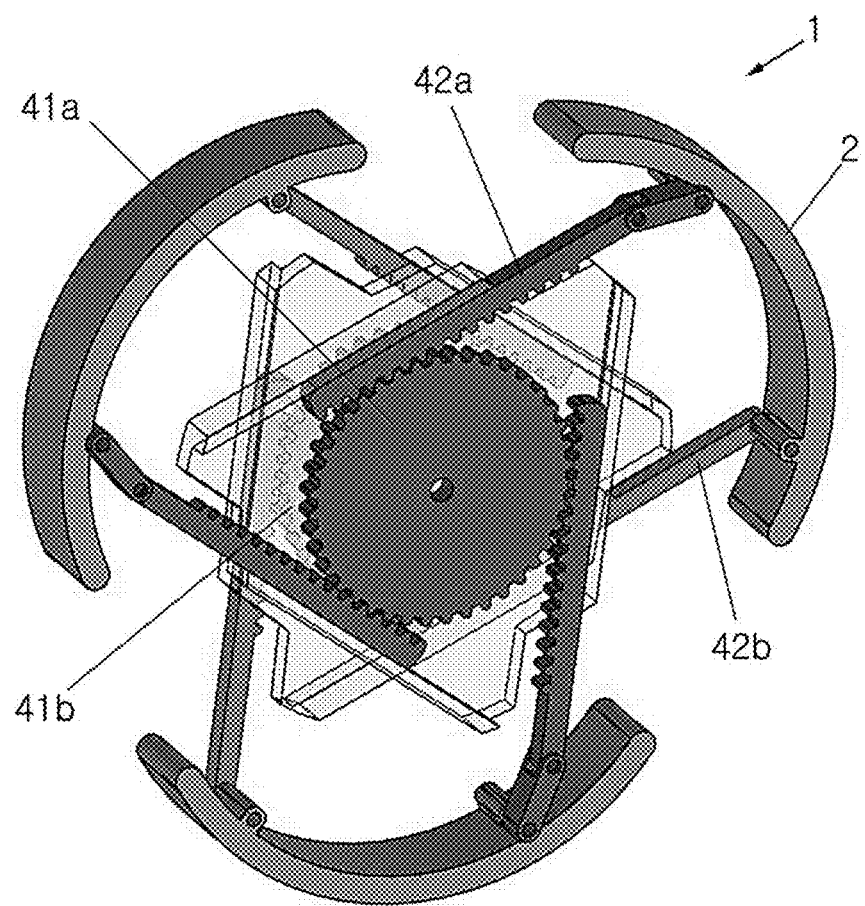

Referring to FIGS. 10A-C, an exemplary shape of the deformed shape of the deformable wheel 1 is shown. FIG. 10A shows a case in which the first rack 42a and the first pinion 41a are driven, and the movement of the first rack 42a by the driving of the first pinion 41a mainly controls the lobe angle ($\theta$). FIG. 10B shows a case in which the second rack 42b and the second pinion 41b are driven, and the movement of the second rack 42b by the driving of the second pinion 41b mainly adjusts the lobe angle ($\theta$) opposite to the case shown in FIG. 10A. FIG. 10C shows a case in which all of the first rack 42a, the first pinion 41a, the second rack 42b and the second pinion 41b are driven, and the wheel radius (r) is mainly adjusted. Accordingly, the wheel radius (r) and the lobe angle ($\theta$) may be controlled by driving of each of the first rack 42a and the second rack 42b, respectively.

Figure 11:
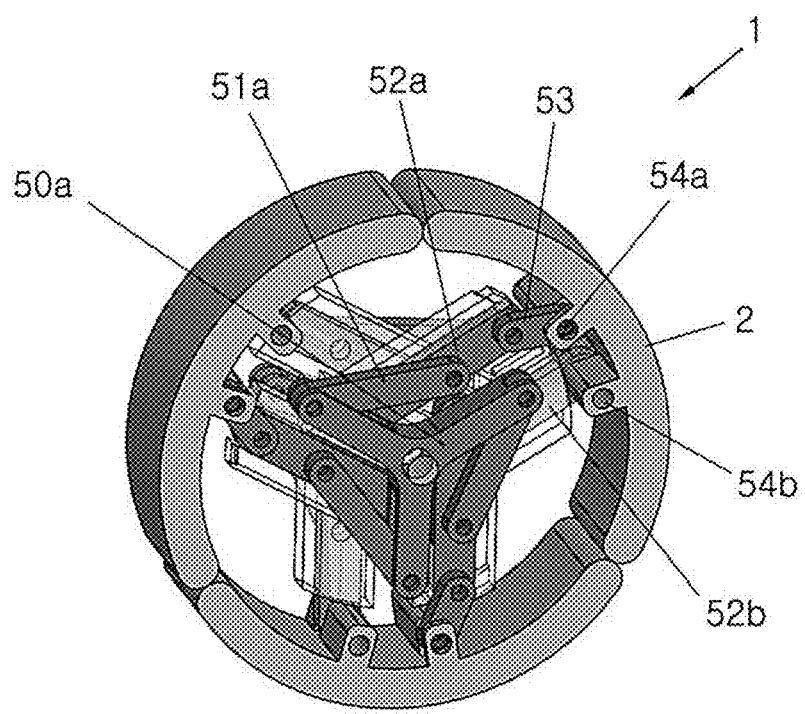
FIG. 11 is a schematic view showing a circular shape of a deformable wheel according to still another embodiment of the present disclosure.

FIGS. 11 and 12 show another embodiment of the deformable wheel 1 having a pair of slide-crank configuration. This embodiment is similar to the drive mechanism of the embodiment of FIGS. 9 and 10.

Referring to FIG. 11, a pair of rotary members 50a, 50b having a ternary link shape are installed at the center of the wheel 1, and link members 51a are connected to the rotary members 50a, 50b, respectively. The link members 51a are pivotally connected to slide members 52a, 52b, respectively, and the slide members 52a, 52b are pivotally connected to the lobes 2, respectively. In the drawing, three first slide members 52a driven by the first rotary member 50a and three second slide members 52b driven by the second rotary member 50b are connected on three lobes 2, but reference numerals are indicated only for the structure connected to one lobe 2, and all lobes 2 and slide-crank structures have the same configuration.

In addition, two hinges Ma, 54b are formed on one lobe 2, so that the first hinge Ma is connected to the first slide member 52a and the second hinge 54b is pivotally connected to the second slide member 52b. At this time, the first hinge Ma and the first slide member 52a are connected through a hinge member 53, and the hinge member 53 is connected to be pivotal at portions connected to the first hinge 54a and the first slide member 52a, respectively.

Figure 12A:
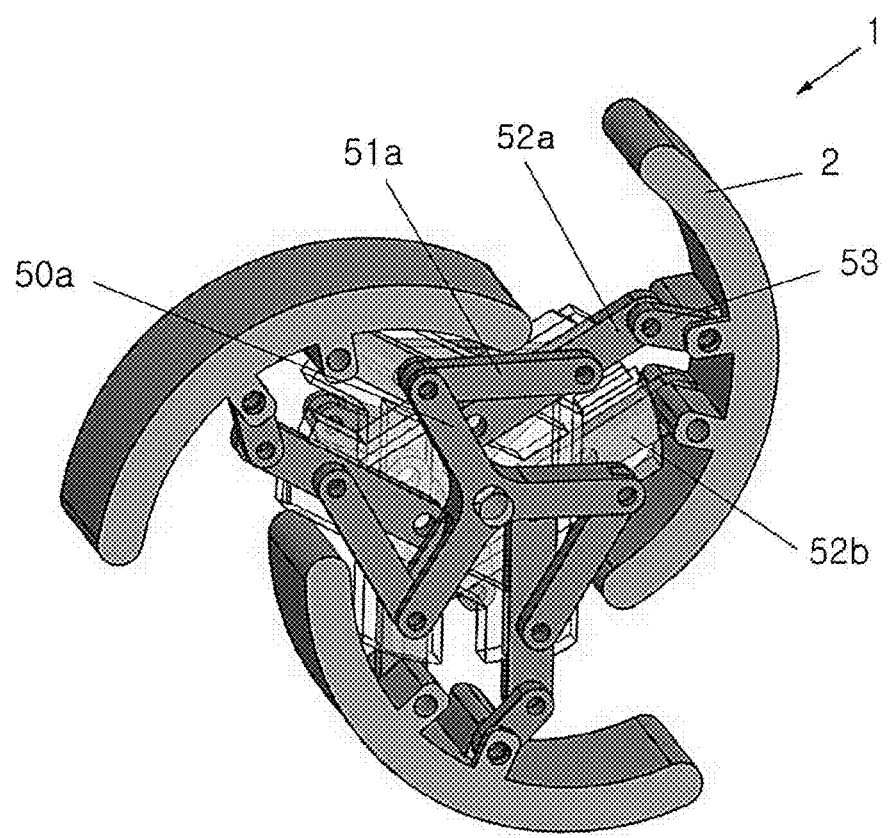
FIGS. 12A to 12C are schematic views showing examples of the deformed shape of the deformable wheel depicted in FIG. 11.
Figure 12B:
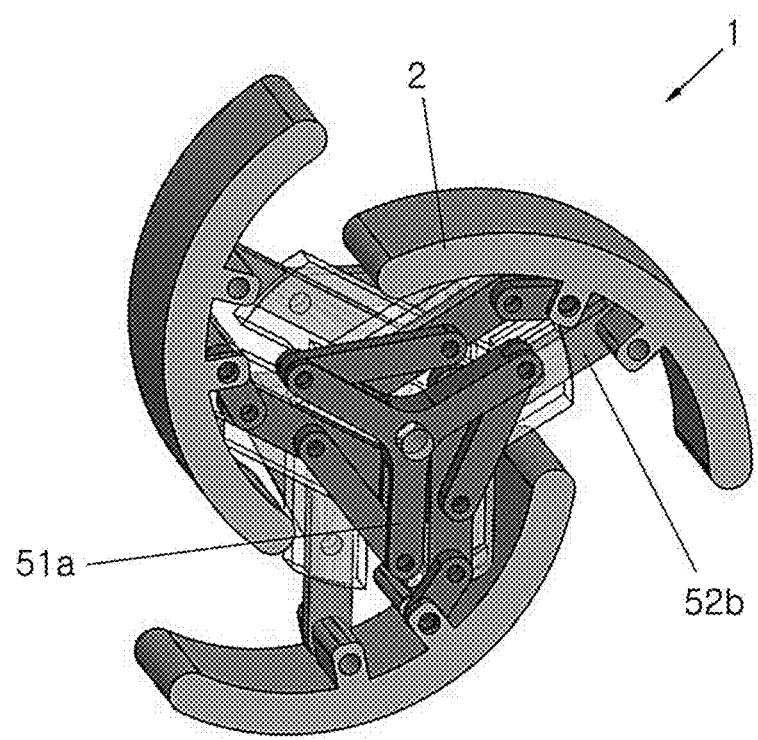
Figure 12C:
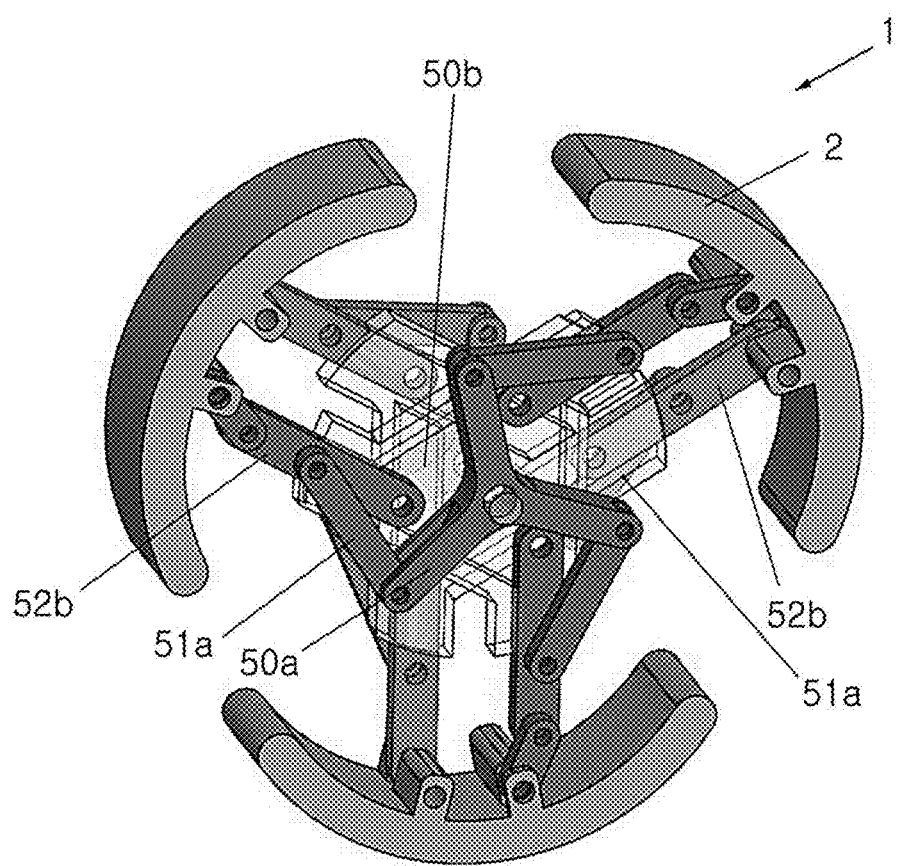

Referring to FIGS. 12A-C, an exemplary shape of the deformed shape of the deformable wheel 1 is shown. FIG. 12A shows a case in which the first rotary member 50a and the first slide member 52a are driven, and the movement of the first slide member 52a by the driving of the first rotary member 50a mainly controls the lobe angle ($\theta$). FIG. 12B shows a case in which the second rotary member 50b and the second slide member 52b are driven, and the movement of the second slide member 52b by the driving of the second rotary member 50b mainly adjusts the lobe angle ($\theta$) opposite to the case shown in FIG. 12A. FIG. 12C shows a case in which all of the first rotary member 50a, the first slide member 52a, the second rotary member 50b and the second slide member 52b are driven, and the wheel radius (r) is mainly adjusted. Accordingly, the wheel radius (r) and the lobe angle ($\theta$) may be controlled by driving of each of the first rotary member 50a and the second rotary member 50b, respectively.

Figure 13:
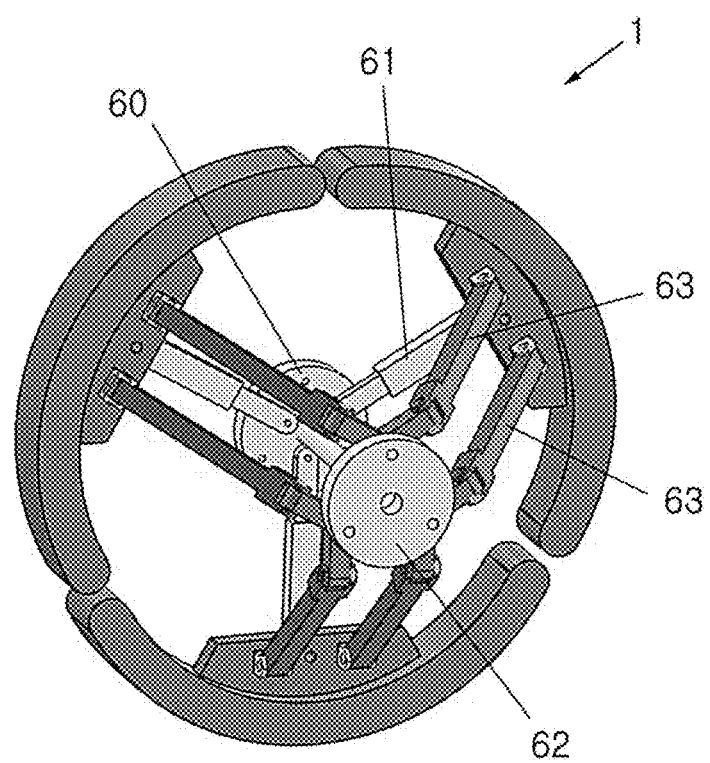
FIG. 13 is a schematic view showing a circular shape of a deformable wheel according to still another embodiment of the present disclosure.

FIGS. 13 and 14 show another embodiment of the deformable wheel 1 having a four-bar link-piston structure.

Referring to FIG. 13, a fixing disk 60 is installed on a shaft of the wheel 1, and a piston 61 connected to the lobe 2 to reciprocate in a radial direction is installed on the fixing disk 60. In addition, a link disk 62 that is movable along the axial direction of the wheel 1 is installed, and the link disk 62 and the lobe 2 are connected by a pair of link members 63. At this time, the link disk 62, the lobe 2 and the pair of link members 63 are driven to configure a four-bar link. In the drawing, a four-bar link formed by the piston 61 and the pair of link members 63 is connected on three lobes 2, but reference numbers are indicated only for the structure connected to one lobe 2, and all lobes 2 and four-bar link-pistons have the same configuration.

Figure 14A:
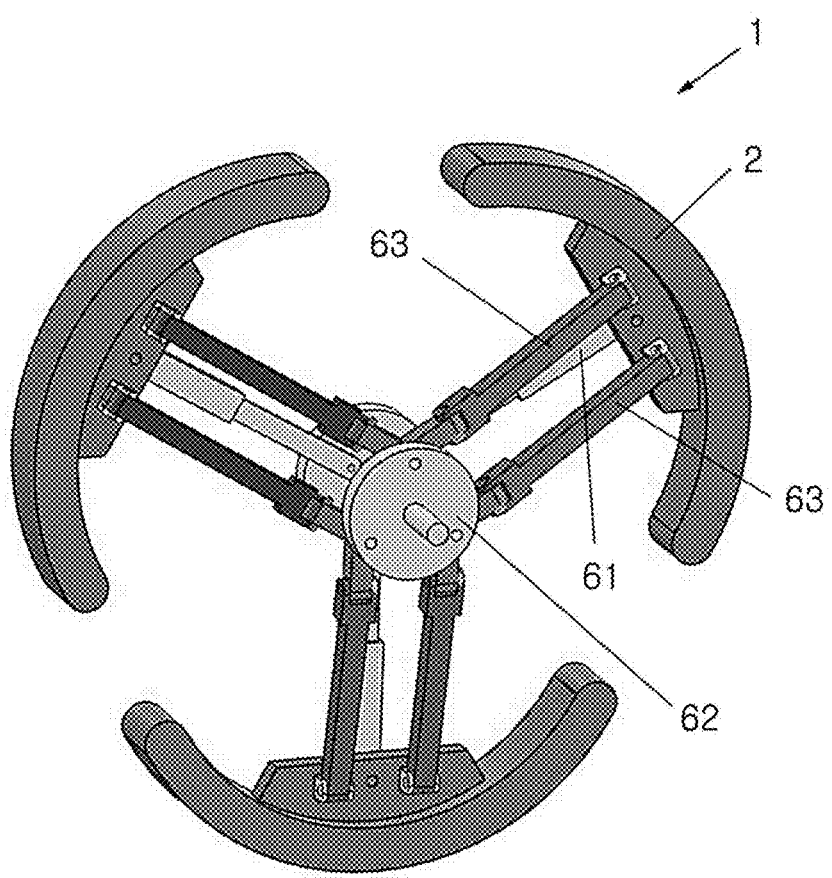
FIGS. 14A to 14C are schematic views showing examples of the deformed shape of the deformable wheel depicted in FIG. 13.
Figure 14B:
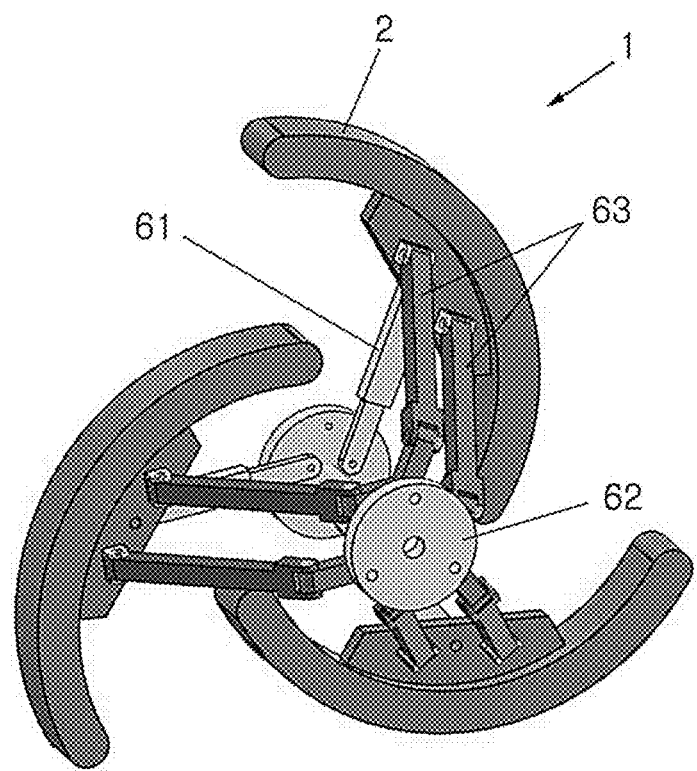
Figure 14C:
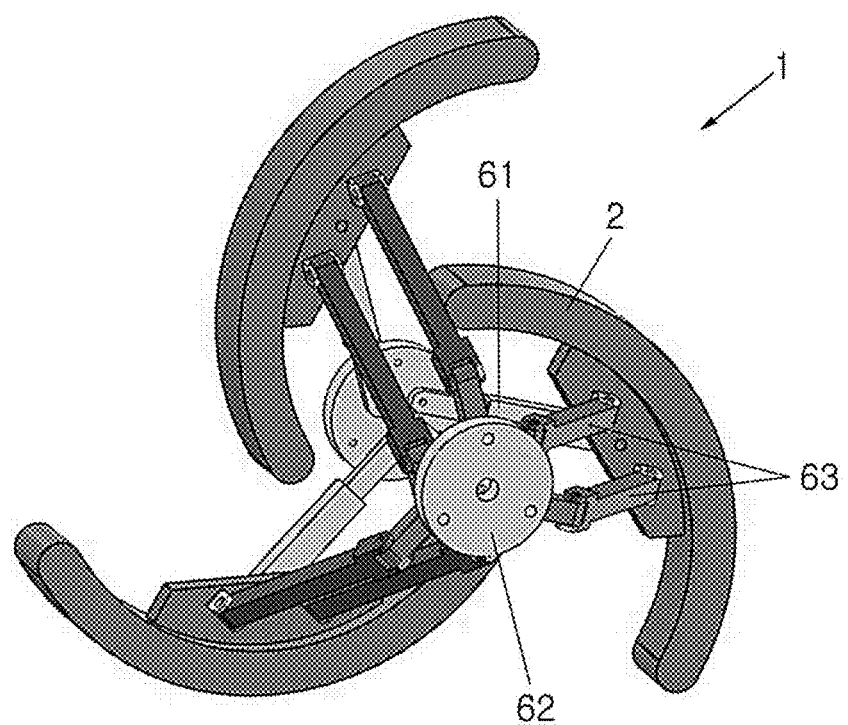

Referring to FIGS. 14A-C, an exemplary shape of the deformed shape of the deformable wheel 1 is shown. FIG. 14A shows a case in which the piston 61 is driven, and as the piston 61 expands, the link disk 62 moves along the shaft 60 toward the piston 61. That is, the wheel radius (r) increases due to the expansion of the piston 61 and the wheel radius (r) decreases due to the contraction of the piston 61, so the wheel radius (r) is adjusted. FIGS. 14B and 14C show a case in which only the four-bar link is driven, and the lobe angle ($\theta$) is adjusted by the driving of the pair of link members 63. Therefore, the wheel radius (r) and the lobe angle ($\theta$) may be controlled by the driving of each of the piston 61 and the four-bar link, respectively.

Figure 15:
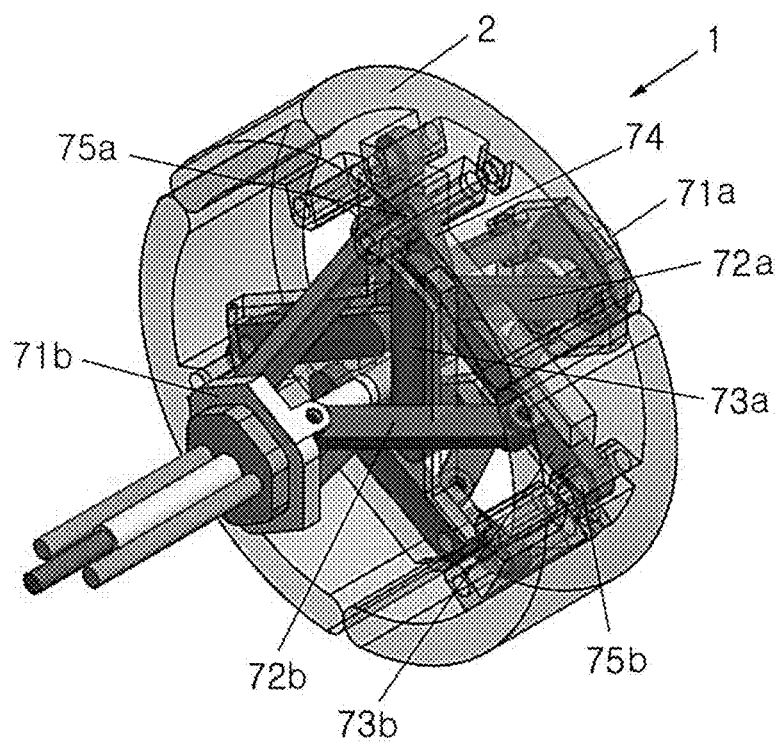
FIG. 15 is a schematic view showing a circular shape of a deformable wheel according to still another embodiment of the present disclosure.

FIGS. 15 and 16 show another embodiment of the deformable wheel 1 having a four-bar link-slide structure.

Referring to FIG. 15, first and second disks 71a, 71b movable along the axial direction of the wheel 1 are installed, and link members 72a, 72b are connected to the first and second disks 71a, 72b, respectively. The link members 72a, 72b are pivotally connected to the slide members 73a, 73b, respectively. In the drawings, three first slide members 73a driven by the first disk 71a and the first link member 72a and three second slide members 73b driven by the second disk 72b and the second link member 72b are connected on three lobes 2, but reference numerals are indicated only for the structure connected to one lobe 2, and all lobes 2 and four-bar link-slide structures have the same configuration.

In addition, two hinges 75a, 75b are formed on one lobe 2, so that the first hinge 75a is connected to the first slide member 73a and the second hinge 75b is pivotally connected to the second slide member 73b. At this time, the first hinge 75a and the first slide member 73a are connected through a hinge member 74, and the hinge member 74 is connected to be pivotal at portions connected with the first hinge 75a and the first slide member 73a, respectively. Accordingly, the slide members 73a, 73b are pivotally connected to the lobes 2, respectively.

Figure 16A:
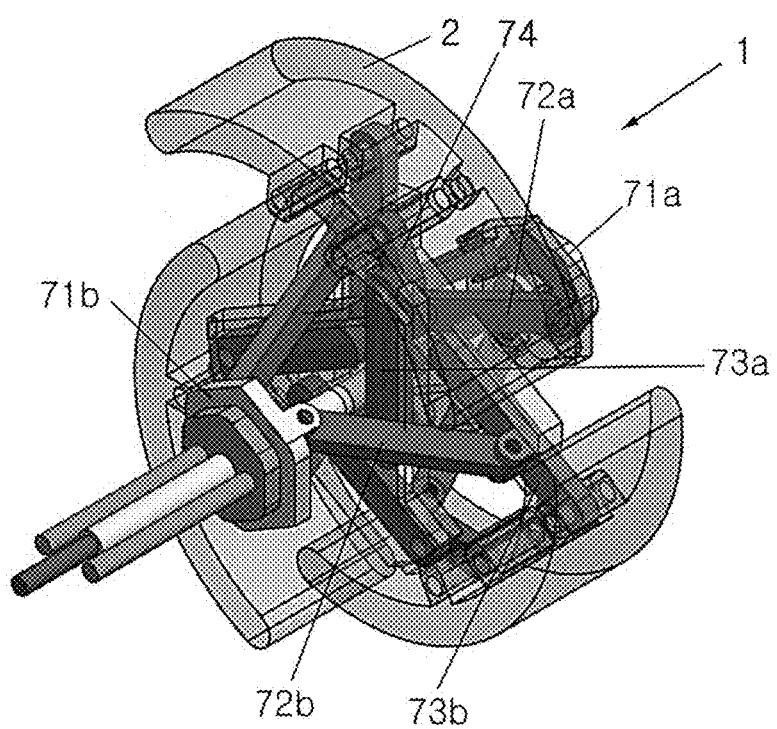
FIGS. 16A to 16C are schematic views showing examples of the deformed shape of the deformable wheel depicted in FIG. 15.
Figure 16B:
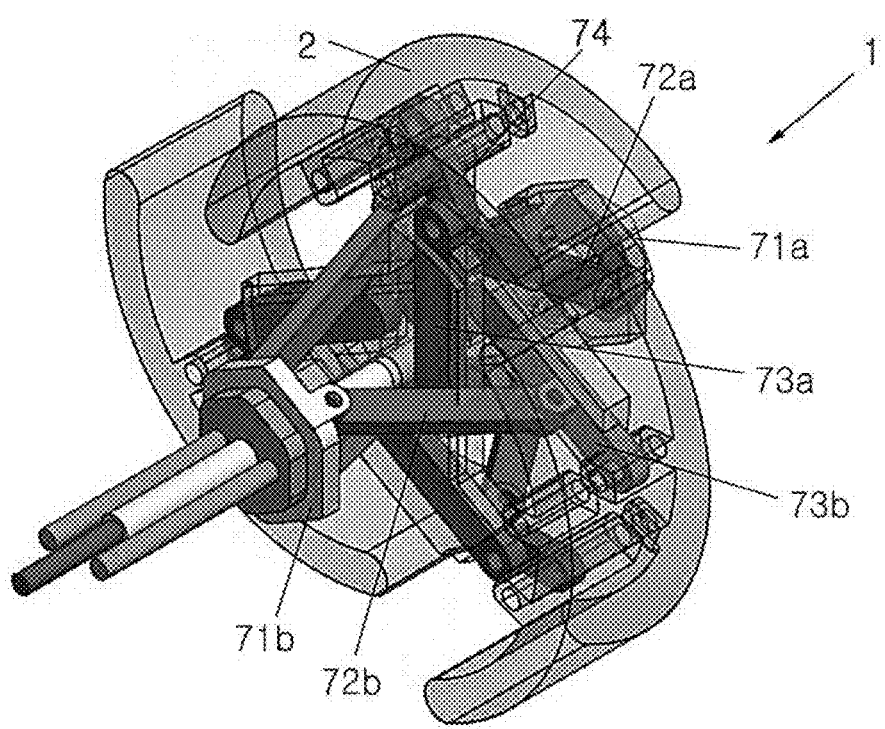
Figure 16C:
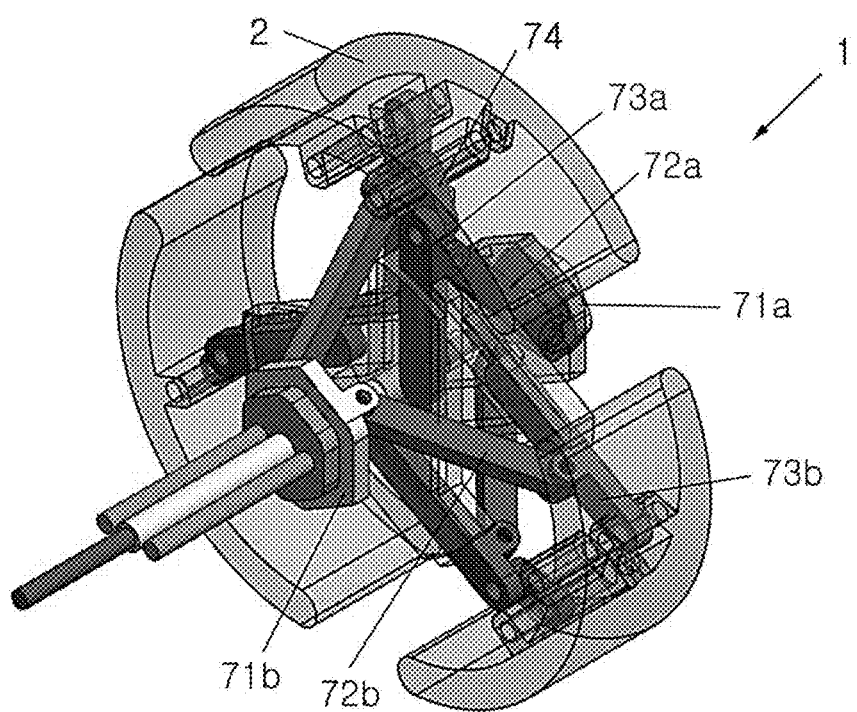

Referring to FIGS. 16A-C, an exemplary shape of the deformed shape of the deformable wheel 1 is shown. FIGS. 16A and 16B show a case in which only one of the first and second disks 71a, 71b is driven. In FIG. 16A, the first disk 71a is not driven, and as the second disk 71b moves in the axial direction of the wheel to approach the deformable wheel 1, the second slide member 73b is driven to adjust the lobe angle (θ). In FIG. 16B, the second disk 71b is not driven, and as the first disk 71a moves in the axial direction of the wheel to approach the wheel 1, the first slide member 73a is driven to adjust the lobe angle (θ). FIG. 16C shows a case in which all of the first disk 71a and the second disk 71b are driven, and the wheel radius (r) is adjusted accordingly. Therefore, the wheel radius (r) and the lobe angle (θ) may be controlled by driving of each of the first disk 71a and the second disk 71b, respectively.

Figure 17:
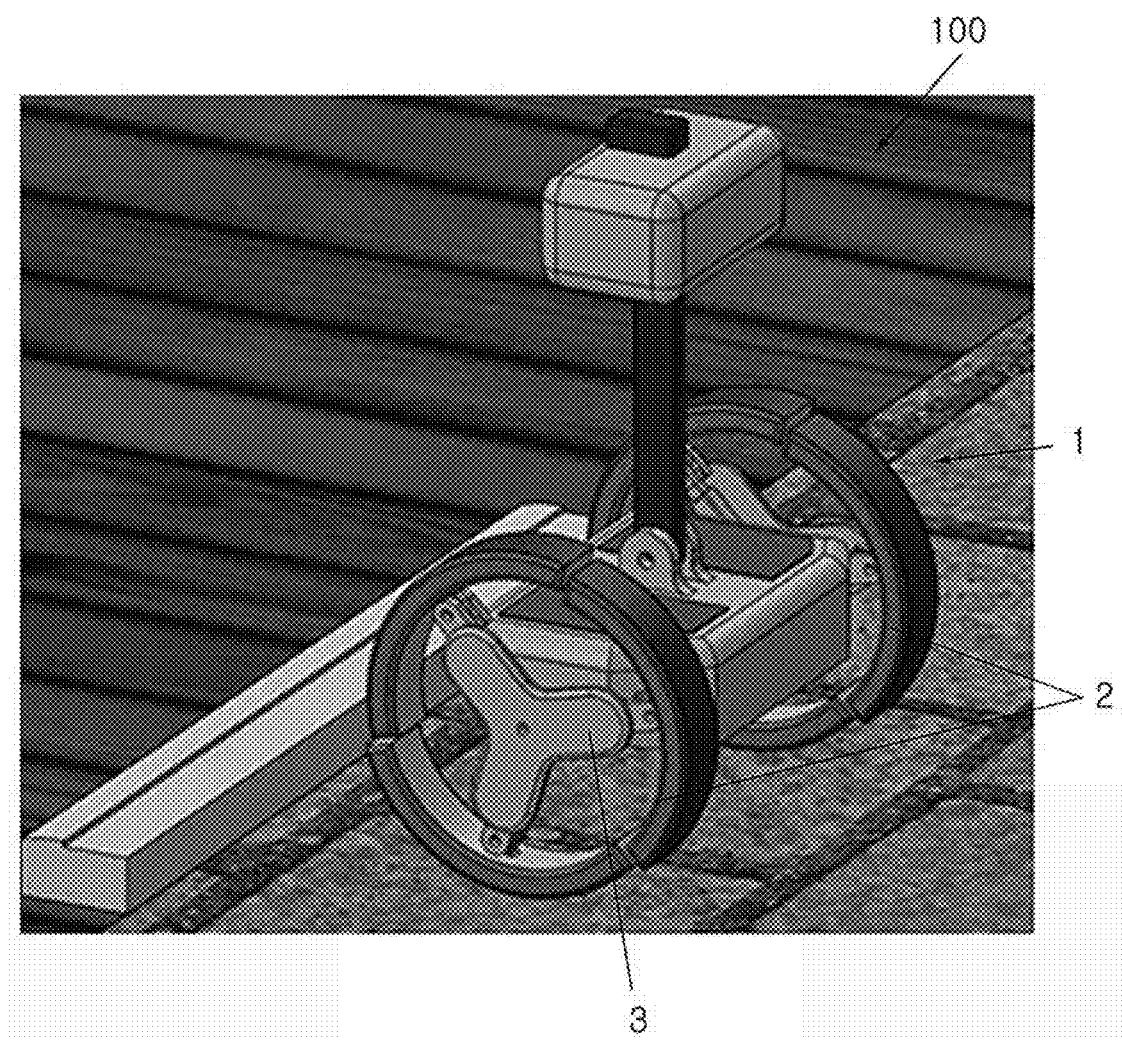
FIG. 17 is a perspective view showing a mobile robot including the deformable wheel of the present disclosure.

FIG. 17 shows a mobile robot 100 including the deformable wheel 1 of the present disclosure. The mobile robot 100 includes a driving unit (not shown) for driving the deformable wheel 1, and the mobile robot 100 drives the deformable wheel 1 in a circular shape during normal driving, and when encountering an obstacle, the mobile robot 100 converts the deformable wheel 1 into a deformed shape according to the obstacle.

Figure 18:
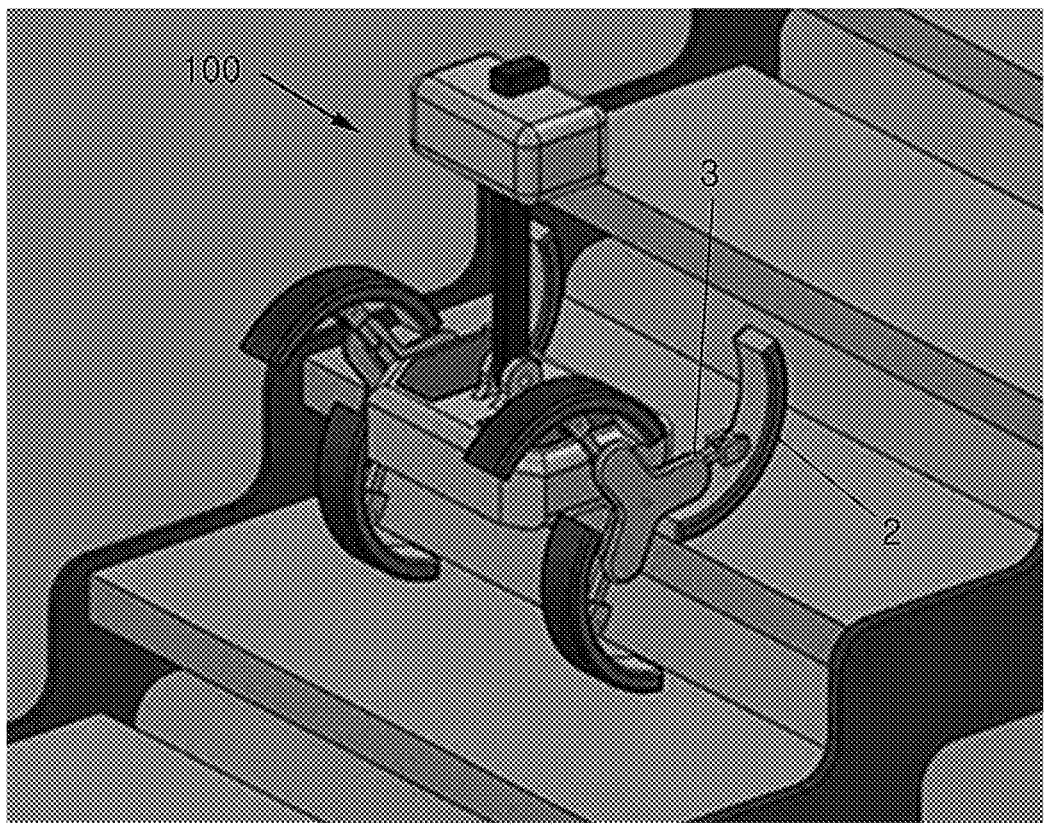
FIG. 18 is a perspective view showing that the mobile robot including the deformable wheel of the present disclosure overcomes stairs.

FIG. 18 shows that when the obstacle is stairs, the mobile robot 100 including the deformable wheel 1 of the present disclosure overcomes the obstacle. By adjusting the angle (θ) of the lobe 2 and the radius (r) of the wheel spoke 3 of the deformable wheel 1, the mobile robot 100 may overcome stairs stably.

As described above, embodiments of the present disclosure have been described in more detail with reference to the accompanying drawings, but the present disclosure is not necessarily limited to these embodiments, and various modifications can be made within the scope not departing from the technical idea of the present disclosure. Therefore, the embodiments explained in the present disclosure are for illustration rather than limiting the technical idea of the present disclosure, and the scope of the technical idea of the present disclosure is not limited by these embodiments. Therefore, it should be understood that the embodiments described above are not restrictive but illustrative in all respects.

The invention claimed is:

1. A deformable wheel, comprising:
a plurality of lobes;
wheel spokes connected to the plurality of lobes, respectively; and
hinges configured to pivotally connect the wheel spokes to the plurality of lobes,
wherein the wheel spokes have two degree-of-freedom motion, and
wherein the plurality of lobes form either a circular shape or a deformed shape separated from each other due to the two degree-of-freedom motion of the wheel spokes.

2. The deformable wheel according to claim 1,
wherein a wheel radius (r) and a lobe angle (θ) of a wheel spoke from the wheel spokes are respectively controlled by the two degree-of-freedom motion.

3. The deformable wheel according to claim 1,
wherein a wheel spoke from the wheel spokes includes:
a fixing member having a plurality of distal ends;
front pulleys and rear pulleys respectively provided at a center and the plurality of distal ends of the fixing member;
a rotation pulley disposed at each front pulley;
a hinge pulley linked with the rotation pulley by a rotation belt and fixedly connected to the lobe; and
a pulley member having one end fixedly connected to the rear pulley provided at the distal end and another end on which the hinge pulley is disposed,
wherein the front pulleys are linked with each other by a front belt and the rear pulleys are linked with each other by a rear belt.

4. The deformable wheel according to claim 1,
wherein a wheel spoke from the wheel spokes includes:
a fixing member;
a rotary member having a plurality of distal ends, the rotary member rotatable with respect to a shaft of the deformable wheel;
a link member having one end pivotally connected to one of the plurality of distal ends of the rotary member and another end connected to be pivotal at a first hinge of the lobe;
pulleys respectively disposed at a center and the plurality of distal ends of the fixing member; and
a pulley member having one end fixedly connected to the pulley provided at the distal end and another end connected to be pivotal at a second hinge of the lobe,
wherein the pulleys are linked with each other by a belt.

5. The deformable wheel according to claim 1,
wherein a wheel spoke of the wheels spokes includes:
a first rotary member and a second rotary member respectively having a plurality of distal ends, the first rotary member and the second rotary member rotatable with respect to a shaft of the deformable wheel;
a first link member having one end pivotally connected to one of the plurality of distal ends of the first rotary member;
a slide member to which another end of the first link member is pivotally connected, the slide member being connected to be pivotal at a first hinge of the lobe; and
a second link member having one end pivotally connected to one of the plurality of distal ends of the second rotary member and another end connected to be pivotal at a second hinge of the lobe.

6. The deformable wheel according to claim 1,
wherein a wheel spoke from the wheels spokes includes:
a first pinion and a second pinion that are rotatable with respect to a shaft of the deformable wheel;
a first rack engaged with the first pinion;
a second rack engaged with the second pinion; and
a hinge member having one end pivotally connected to the first rack and another end connected to be pivotal at a first hinge of the lobe,
wherein the second rack is connected to be pivotal at a second hinge of the lobe.

7. The deformable wheel according to claim 1,
wherein a wheel spoke from the wheel spokes includes:
a first rotary member and a second rotary member respectively having a plurality of distal ends, the first rotary member and the second rotary member rotatable with respect to a shaft of the deformable wheel;
a first link member having one end pivotally connected to one of the plurality of distal ends of the first rotary member;
a first slide member to which another end of the first link member is pivotally connected;
a second link member having one end pivotally connected to one of the plurality of distal ends of the second rotary member;
a second slide member to which another end of the second link member is pivotally connected, the second slide member being connected to be pivotal at a second hinge of the lobe; and a hinge member having one end pivotally connected to the first slide member and the other end connected to be pivotal at a first hinge of the lobe.

8. The deformable wheel according to claim 1, wherein a wheel spoke from the wheel spokes includes:
a fixing disk;
a link disk that is movable with respect to a shaft of the deformable wheel:
a piston disposed on the fixing disk to reciprocate in a radial direction and pivotally connected to the lobe; and
a pair of link members that form a four-bar link between the lobe and the link disk.

9. The deformable wheel according to claim 1, wherein a wheel spoke from the wheel spokes includes:
a first disk and a second disk that are movable with respect to a shaft of the deformable wheel;
a first link member having one end pivotally connected to the first disk;
a first slide member to which another end of the first link member is pivotally connected;
a second link member having one end pivotally connected to the second disk;
a second slide member to which another end of the second link member is pivotally connected, the second slide member being connected to be pivotal at a second hinge of the lobe; and
a hinge member having one end pivotally connected to the first slide member and the other end connected to be pivotal at a first hinge of the lobe.

10. A mobile robot, comprising:
a deformable wheel according to claim 1; and
a driving unit configured to control the deformable wheel.

\* \* \* \* \*